United States Patent Office 3,697,428
Patented Oct. 10, 1972

3,697,428
ADDITIVES FOR LUBRICANTS AND FUELS
Norman A. Meinhardt, Lyndhurst, and Robert Widmer, Painesville, Ohio, assignors to The Lubrizol Corporation, Wickliffe, Ohio
No Drawing. Continuation of application Ser. No. 162,704, July 14, 1971, which is a continuation of application Ser. No. 812,405, Apr. 1, 1969, both abandoned. This application Nov. 1, 1971, Ser. No. 194,566
Int. Cl. C10m 1/26
U.S. Cl. 252—56 D   16 Claims

ABSTRACT OF THE DISCLOSURE

Oil-soluble compositions produced by reacting polycarboxylic acid acylating agents having at least fifty aliphatic carbon atoms with a di- or trihydric alcohol and a polyhydric alcohol having at least four hydroxyl groups are useful as ashless dispersants in lubricants and fuels. Polyolefin-substituted succinic anhydride simultaneously treated with a mixture of trismethylolpropane and pentaerythritol produces such an oil-soluble composition.

---

This is a continuation application of earlier filed copending application Ser. No. 162,704, filed July 14, 1971, which is a "streamlined continuation" of Ser. No. 812,405, filed Apr. 1, 1969, respectively, both applications having now been abandoned.

This invention relates to novel oil-soluble compositions. In particular, this invention is concerned with oil-soluble compositions prepared by reacting certain carboxylic acid acylating agents with mixtures of certain polyhydric alcohols and to lubricants and fuels containing these compositions.

Recently, many patents have issued which have been directed to lubricant and fuel additives commonly referred to as ashless dispersants or ashless detergents. Many of these additives are the reaction products of relatively high molecular weight carboxylic acid acylating agents and amines or alcohols such as exemplified in U.S. Pats. 3,172,-892; 3,219,666; 3,272,746; 3,341,542; and 3,381,022. When employed in lubricants, particularly crankcase lubricants for internal combustion engines, these additives prevent or reduce the formation of sludges, neutralize acidic contaminants, etc. In fuels, these additives promote engine fuel system cleanliness, reduce exhaust deposits, and the like, see U.S. Pats. 3,346,354 and 3,347,645. The novel oil-soluble compositions of the present invention can be employed as additives for fuels and lubricants in the same general manner as the ashless dispersants described in these incorporated patents.

It is a principal object of this invention to provide novel oil-soluble compositions and processes for their preparation, and to provide lubricants and fuels containing effective amounts of these oil-soluble compositions.

These and other objects of this invention are achieved by providing oil-soluble compositions produced by the process comprising reacting under esterification conditions (A) at least one substituted aliphatic polycarboxylic acid acylating agent having an average of at least about 50 aliphatic carbon atoms in the substituents with (B) at least one aliphatic polyhydric alcohol having two to three hydroxyl groups and (C) at least one aliphatic polyhydric alcohol containing at least four hydroxyl groups where the molar ratio of $(A):(B):(C)$ is about $1:X:Y$ where $5 \geq X+Y \geq 0.5$. The novel lubricant and fuels of this invention are readily prepared by incorporating these oil-soluble compositions into the fuel or lubricant.

The polycarboxylic acid acylating agents, that is, reactant (A), are well known in the art and have been described in detail, for example, in U.S. Pats. 3, 172,892; 3,219,666; 3,272,746; 3,341,542; and 3,381,022. For the sake of brevity, these prior patents are incorporated herein. One particularly important characteristic of the acylating agent is its size. Thus, the acylating agent should contain at least about 50 aliphatic carbon atoms in the substituent atoms. This limitation is based upon both oil-solubility considerations and the effectiveness of the compositions as additives in lubricants and fuels. Another important characteristic of the acylating agent is that it preferably should be substantially saturated, i.e., at least about 95% of the total number of the carbon-to-carbon covalent linkages therein should be saturated linkages. In an especially preferred aspect of the invention, at least about 98% of these covalent linkages are saturated. Obviously, all may be saturated. A greater degree of unsaturation renders the esters more susceptible to oxidation, degradation, and polymerization and this lessens the effectiveness of the final products as lubricant and fuel additives.

In addition, the acylating agents should be substantially free from oil-solubilizing pendant groups, that is, groups having more than about six aliphatic carbon atoms. Although, some such oil-solubilizing pendant groups may be present, they preferably will not exceed one such group for every twenty-five aliphatic carbon atoms in the principal hydrocarbon chain of the acylating agent. The acylating agent may contain polar substituents. Typical polar substituents are halo, such as chloro and bromo, oxo, oxy, formyl, sulfonyl, sulfinyl, thio, nitro, etc. Such polar substituents, if present, preferably will not exceed 10% by weight of the total weight of the hydrocarbon portion of the carboxylic acid radical excluding the weight of the carboxylic acid groups, e.g.

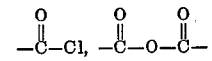

etc.

As disclosed in the foregoing patents, there are several processes for preparing the acylating agents. Generally, these processes involves the reaction of (1) an ethylenically unsaturated carboxylic acid, acid halide, anhydride, or equivalent acidic reactant with (2) an ethylenically unsaturated hydrocarbon containing at least about 50 aliphatic carbon atoms or a chlorinated hydrocarbon containing at least 50 aliphatic carbon atoms at a temperature within the range of about 100°–300° C. The chlorinated hydrocarbon or ethylenically unsaturated hydrocarbon reaction can, of course, optionally contain polar substituents, oil-solubilizing pendant groups, and be unsaturated within the general limitations explained hereinabove and in the incorporated patents. When preparing the carboxylic acid acylating agent according to one of these two processes, the acidic reactant usually corresponds to the formula $R_o—(COOH)_n$, where $R_o$ is characterized by the presence of at least one ethylenically unsaturated carbon-to-carbon covalent bond and $n$ is an integer from two to six and preferably two. The acidic reactant can also be the corresponding carboxylic acid halide, anhydride, ester, or other equivalent acylating agent and mixtures of one or more of these. Ordinarily, the total number of carbon atoms in the acidific reactant will not exceed ten and generally will not exceed six. Preferably the acidic reactant will have at least one ethylenic linkage in an α,β-position with respect to at least one carboxyl function. Exemplary acidic reactants are maleic acid, maleic anhydride, fumaric acid, itaconic acid, itaconic anhydride, citraconic acid, citraconic anhydride, mesaconic acid, glutaconic acid, chloromaleic acid, aconitic acid, and the like.

As is apparent from the foregoing, the carboxylic acid acylating agents may contain cyclic and/or aromatic groups. However, the acids are essentially aliphatic in nature and in most instances, the preferred acylating agents are aliphatic polycarboxylic acid, anhydrides, and halides.

The substantially saturated aliphatic hydrocarbon substituted succinic acids and anhydrides are especially preferred as acylating agents in the preparation of the mixed esters of the present invention. These succinic acid acylating agents are readily prepared by reacting maleic anhydride with a high molecular weight olefin or a chlorinated hydrocarbon such as a chlorinated polyolefin. The reaction involves merely heating the two reactants at a temperature of about 100°–300° C., preferably, 100°–200° C. The product from such a reaction is a substituted succinic anhydride where the substituent is derived from the olefin or chlorinated hydrocarbon as described in the above cited patents. The product may be hydrogenated to remove all or a portion of any ethylenically unsaturated covalent linkages by standard hydrogenation procedures, if desired. The substituted succinic anhydrides may be hydrolyzed by treatment with water or steam to the corresponding acid.

The ethylenically unsaturated hydrocarbon reactant and the chlorinated hydrocarbon reactant used in the preparation of the acylating agents are principally the high molecular weight, substantially saturated petroleum fractions and substantially saturated olefin polymers and the corresponding chlorinated products. The polymers and chlorinated polymers derived from mono-olefins having from two to about thirty carbon atoms are preferred. Especially useful are the polymers and chlorinated polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene.

The interpolymers of 1-mono-olefins such as illustrated above with each other and with other interpolymerizable olefinic substances such as aromatic substituted olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

For reasons of oil-solubility and stability, the hydrocarbons contemplated for use in preparing the acylating agents of this invention should be substantially aliphatic and substantially saturated, that is, they should contain at least about 80% and preferably about 95%, on a weight basis, of units derived from aliphatic mono-olefins. Preferably, they will contain no more than about 5% olefinic linkages based on the total number of the carbon-to-carbon covalent linkages present.

The chlorinated hydrocarbons and ethylenically unsaturated hydrocarbons used in the preparation of the acylating agents can have molecular weights of from about 700 up to about 100,000 or even higher. The preferred materials for preparing the acylating agents are the above-described polyolefins and chlorinated polyolefins having an average molecular weight of about 700 to about 5,000. When the acylating agent has a molecular weight in excess of about 10,000, the acylated nitrogen composition also possess viscosity index improving qualities.

In lieu of the high molecular weight hydrocarbons said chlorinated hydrocarbons discussed above, hydrocarbons containing activating polar substituents which are capable of activating the hydrocarbon molecule in respect to reaction with an ethylenically unsaturated acid reactant may be used in the above-illustrated reactions for preparing the acylating agents. Such polar substituents include sulfide and disulfide linkages, and nitro, mercapto, carbonyl, and formyl radicals. Examples of these polar-substituted hydrocarbons include polypropene sulfide, di-polyisobutene disulfide, nitrated mineral oil, di-polyethylene sulfide, brominated polyethylene, etc.

The acylating agents may also be prepared by halogenating a high molecular weight hydrocarbon such as the above described olefin polymers to produce a polyhalogenated product, converting the poly-halogenated product to a poly-nitrile, and then hydrolyzing the poly-nitrile. They may be prepared by oxidation of a high molecular weight polyhydric alcohol with potassium permanganate, nitric acid, or a similar oxidizing agent. Another method for preparing poly-carboxylic acid acylating agents involves the reaction of an olefin or a polar-substituted hydrocarbon such as a chloropolyisobutene with an unsaturated poly-carboxylic acid such as 2-pentene-1,3,5-tricarboxylic acid prepared by dehydration of citric acid.

Poly-carboxylic acid acylating agents can also be obtained by reacting chlorinated poly-carboxylic acids, anhydrides, acyl halides, and the like with ethylenically unsaturated hydrocarbons or ethylenically unsaturated substituted hydrocarbons such as the polyolefins and substituted polyolefins described hereinbefore in the manner described in 3,340,281.

Poly-carboxylic acid anhydrides are obtained by dehydrating the corresponding acids. Dehydration is readily accomplished by heating the acid to a temperature above about 70° C., preferably in the presence of a dehydration agent, e.g., acetic anhydride. Cyclic anhydrides are usually obtained from poly-carboxylic acids having acid radicals separated by no more than three carbon atoms such as substituted succinic or glutaric acid, whereas linear anhydrides are obtained from poly-carboxylic acids having the acid radicals separated by four or more carbon atoms.

The acid halides of the poly-carboxylic acids can be prepared by the reaction of the acids or their anhydrides with a halogenating agent such as phosphorus tribromide, phosphorus pentachloride, or thionyl chloride in the conventional manner.

The di- and trihydric aliphatic alcohols which can be used as reactant (B) are quite diverse. They include, for example, alkylene glycols such as ethylene glycol, propylene glycol, trimethylene glycol, butylene glycol, and polyglycols, such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to eight carbon atoms and preferably from two to four carbon atoms. Other useful di- and trihydric alcohols include glycerol, 9,10-dihydroxy stearic acid and its lower alkyl esters such as the ethyl ester, 3-chloro-propanediol-1,2, 1,2-butanediol, 2,3 - hexanediol, pinacol, 1,4 - dihydroxy - 2 - nitrobutane, amino alcohols such as di - (2 - hydroxyethyl) amine, tri-(2-hydroxypropyl) amine, N,N'-di-(hydroxyethyl)ethylenediamine, N,N-di(2-hydroxyethyl) glycine and the lower alkyl esters thereof.

The preferred di- and trihydric aliphatic alcohols are the di- and trihydric lower alkanols, that is, di- and trihydric alkanols containing up to seven carbon atoms. This preferred class of di- and trihydric lower alkanols include alkylene glycols containing up to seven carbon atoms in the alkylene group such as illustrated above, glycerol, β - hydroxymethyl - 2 - methyl - 1,3 - propanediol (i.e., trimethylolethane or TME), 2 - hydroxymethyl - 2 - ethyl - 1,3 - propanediol (i.e., trimethylolpropane or TMP), 1,2,4 - butanetriol 1,2,6 - hexanetriol, 1,2,3 - pentanetriol, 1,2,3 - hexanetriol, 1,2,4 - hexanetriol, 1,2,5 - hexanetriol, 2,3,4 - hexanetriol, and mixtures of two or more of these. Especially preferred alcohols for use as reactant (B) are trimethylolethane (TME), trimethylolpropane (TMP), and mixtures of these.

Reactant (C), an aliphatic alcohol containing at least four hydroxy groups can be quite diverse. Alcohols useful as reactant (C) include amino alcohols such as N,N,N',N' - tetrakis(2 - hydroxypropyl)ethylenediamine and N,N,N',N' - tetrakis(2 - hydroxyethyl)ethylenediamine; dipentaerythritol; sugar alcohols such as glucose and arabitose, and the like. However, the polyhydric lower alkanols containing at least four hydroxy groups are preferred. This preferred class is exemplified by pentaerythritol, erythritol, threitol, ribitol, xylitol, arabitol, sorbitol, mannitol, and mixtures of two or more of these alcohols. Pentaerythritol, mannitol, sorbitol, and mixtures containing two or more of them are especially preferred as reactant (C).

The oil-soluble compositions of the present invention are readily prepared by reacting (A), (B), and (C) under conventional esterification conditions. These reactants are preferably mixed together and reacted simultaneously in amounts such that the molar ratio of $(A):(B):(C)$ is expressed by the ratio $1:X:Y$ where $5 \geq X+Y \geq 0.5$ and $X$ is about equal to or greater than $Y$. Because of the stoichiometry involved, there is usually no advantage in using amounts of (B) and (C) such that the value of $X+Y$ in the above ratio exceeds 3. Good results are achieved when the value of $X+Y$ is between about 0.75 and 2.0 and $X \geq Y$.

While a preferred aspect of the invention requires the simultaneous reaction of (A), (B), and (C), it is also contemplated that (A) and (B) can first be reacted under esterification conditions and then (C) reacted with the product of (A) and (B), again under conventional esterification conditions.

If desired, the esterification process can be conducted in the presence of a substantially inert organic diluent. The presence of the diluent can facilitate temperature control and the mixing of the reactants. If a diluent is selected which forms an azeotrope with water, the diluent assists in the removal of water from the reaction mixture. Suitable diluents include, for example, the aliphatic, cycloaliphatic, and aromatic hydrocarbons and the corresponding chlorinated hydrocarbons such as benzene, toluene, xylene, chlorobenzene, hexane, heptane, cyclohexane, mineral oil, mixtures thereof and the like. Ethers and ketones can also be used. Of course, where the alcoholic reactants are liquids at the reaction temperature, excess polyhydric alcohol can function as a diluent.

The esterification conditions contemplated by the present invention are those normally used in the preparation of carboxylic acid esters. The reactants would generally be heated at a temperature of at least 100° C. up to about 300° C. and preferably at a temperature between about 150° C. and 250° C. Conventional esterification catalyst may be used to promote the esterification reaction. Suitable catalysts include sulfuric acid, pyridine hydrochloride, hydrochloric acid, benzene sulfonic acid, p-toluene sulfonic acid, phosphoric acid, and other known esterification catalyst. The catalyst, if present can be employed in amounts from about 0.01% to about 5% by weight based on the total weight of the reaction mixture.

As suggested above, the acylating agent can be the carboxylic acid per se the corresponding anhydride, the acylhalide, or other conventional acylating agent. Generally, the carboxylic acid or its anhydride, usually the latter, will be employed. As is obvious to those skilled in the art, a lower alkyl ester could be used as an acylating agent in a transesterification reaction.

However, processes for preparing carboxylic acid esters of polyhydric alcohols are well known and no further description of these conventional esterification conditions are necessary. For example, detailed discussion of esterification conditions suitable for preparing the oil-soluble compositions of this invention is found in U.S. Pat. 3,381,022.

The reaction products of the foregoing described processes are the oil-soluble compositions contemplated as lubricant and fuel additives by the present invention. These reaction products are a complex mixture of esters formed by the reaction of the polycarboxylic acid acylating agent and the polyhydric alcohols. The precise composition of this mixture of esters will vary with the particular reactants employed and the ratio of the reactants. Furthermore, the reaction mass containing the desired oil-soluble complex ester reaction product of the invention may contain unreacted acylating agent and/or polyhydric alcohols. As long as these materials are soluble in the resulting reaction mass, they can remain without any undue adverse effect on the utility. If desired, unreacted volatile oil-soluble materials can be removed by standard techniques such as distillation. If the reaction mass contains insoluble materials, they should be removed by conventional techniques, e.g., filtration, centrifugation, decantation, etc., prior to use in lubricants and fuels.

Where the reaction mass contains unreacted acylating agent it is sometimes desirable to post-treat the reaction mass with an amine or basically reacting metal compound such as ethylene diamine, diethylene triamine, triethylenetetramine, tetraethylenepentamine, pentaethylenehexamine, propylenediamine, trimethylenediamine, aminoethylpiperazine, piperazine, barium hydroxide, barium oxide, calcium hydroxide, calcium oxide, magnesium oxide, and calcium methoxide to neutralize the unreacted acid, anhydride, etc.

Furthermore, it has been found that the dispersant properties of the oil-soluble compositions may be improved if they are post-treated with epoxides or lower mono- or poly-carboxylic acid acylating agents. Suitable epoxides include ethylene oxide, propylene oxide, butylene oxide, epichlorohydrin, and the like. Lower carboxylic acids which can be used include, formic acid, acetic acid, propionic acid, butanoic acid, adipic acid, maleic acid, oxalic acid, and the like. Details for these post-treatment procedures can be found in commonly assigned copending applications Ser. No. 712,606 filed Mar. 13, 1968, and Ser. No. 717,429 filed Mar. 29, 1968, both applications having now been abandoned. Application Ser. No. 712,606 is available through application Ser. No. 866,084 filed Oct. 3, 1969, now U.S. Pat. 3,579,450. Application Ser. No. 866,084 is a continuation application of Ser. No. 712,606. Application Ser. No. 717,429 is available through application Ser. No. 4,180 filed Dec. 29, 1969, now U.S. Pat. 3,639,242. Application Ser. No. 4,180 is a continuation-in-part application of application Ser. No. 717,429.

The following examples are illustrative of preferred embodiments of the oil-soluble compositions contemplated by the present invention. Unless otherwise indicated, all percentages and "parts" as used in the following examples and elsewhere in the specification and claims represent percent by weight and parts by weight.

EXAMPLE 1

A mixture comprising 794 parts of polyisobutenyl-substituted succinic anhydride having an average molecular weight of about 1100–1150 (prepared by first chlorinating poly isobutylene having an average molecular weight of about 1000–1050 and reacting the resulting chlorinated polyisobutylene with maleic anhydride according to the general procedure discussed in detail in U.S. Pat 3,172,892), 96 parts of TMP, 96 parts pentaerythritol, and 450 parts xylene are heated for seven hours while maintaining a temperature within the range of 170–220° C. Water is removed as an azeotrope with xylene, stripped by heating to 225° C. and reducing the pressure to 9 mm. (Hg). Then 650 parts of mineral diluent oil is added to the stripped material and the whole is filtered, the filtrate being a 40% oil solution of the desired oil-soluble composition.

EXAMPLE 2

A mixture comprising 925 parts of polyisobutenyl-substituted succinic anhydride having an average molecular weight of about 1150 (prepared according to the general process indicated in Example 1 above), 109.5 parts of TMP, 43.9 parts of pentaerythritol, and 225 parts of xylene are heated nine hours while maintaining a temperature of 190–210° C. The reaction mass is then stripped to 180° C. and a pressure of 10 mm. (Hg) over a two-hour period 706 parts of mineral diluent oil added, and filtered. The filtrate is an oil solution of the desired oil-soluble composition.

EXAMPLE 3

A reaction mixture comprising 1731 parts of polyisobutenyl-substituted succinic anhydride (described in Example 1), 206 parts of TMP, 103 parts of pentaerythritol, 300 parts of xylene, and 1342 parts of diluent mineral oil are heated for eight hours at a temperature of 192–228° C. The water formed during the reaction is removed as an azeotrope with the xylene. Thereafter, the reaction mass is stripped to 195° C. and a pressure of 10–20 mm. (Hg) over a one-hour period and filtered. The filtrate is an oil solution of the desired oil-soluble composition.

EXAMPLE 4

Another oil-soluble composition of this invention is prepared by heating a reaction mixture comprising 925 parts of the polyisobutenyl-substituted succinic anhydride of Example 1, 99.2 parts of TME, 43.9 parts of pentaerythritol, and 225 parts of xylene, for five hours at a temperature of about 180–190° C. Then 690 parts of diluent mineral oil are added to the mass and the whole is stripped to a temperature of 200° C. and a pressure of 10 mm. (Hg) and filtered. The filtrate is an oil solution of the desired oil-soluble composition.

EXAMPLE 5

A mixture comprising 808 parts of the polyisobutenyl-substituted succinic acid of Example 1, 59.6 parts of TMP, 34.7 parts of TME, 38.4 parts of pentaerythritol, 225 parts xylene, and 618 parts of mineral diluent oil is heated for four hours while maintaining a temperature of 190°–213° C. The reaction mass is then stripped to temperature of 193° C. and a pressure of 15 mm. (Hg) and filtered. The filtrate is an oil solution of the desired oil-soluble composition.

EXAMPLE 6

A mixture comprising 1731 parts of the polyisobutenyl-substituted succinic anhydride of Example 2, 206 parts of TMP, 300 parts of xylene, and 700 parts of mineral oil are heated for ten hours at 190°–210° C. Water is removed from the mixture as an azeotrope with xylene. Then 206 parts of pentaerythritol is added to the mixture which is subsequently heated for twenty hours at 180°–220° C. The reaction mass is then filtered and the filtrate stripped by heating from 156° C. to 205° C. and a pressure of 18 mm. (Hg) over a 1.5-hour period. More diluent oil is added to produce an oil solution of the desired composition which comprises about 40% oil.

EXAMPLE 7

The general procedure of Example 1 is repeated using a mixture of polyisobutenyl-substituted succinic acid (average M.W. 2700–2800), TMP, pentaerythritol, and sorbitol in amounts such that the molar ratio of the reactants in the starting mixture is about 1:1:0.25:0.25.

EXAMPLE 8

Following the general procedure of Example 1, a mixture of polypropylene-substituted succinic acid anhydride (average M.W.-1000 prepared by reacting chlorinated polypropylene having an average M.W. of about 900 and a chlorine content of 4% with maleic acid anhydride at about 200° C.), propylene glycol, and mannitol in amounts such that the molar ratio is about 1:0.7:0.3 are reacted to produce another oil-soluble composition of this invention.

EXAMPLE 9

Employing the general procedure of Example 1, another complex ester included within the scope of the oil-soluble compositions of this invention is prepared by heating a mixture of polyisobutenyl-substituted succinic anhydride as described in Example 1, tri-($\beta$-hydroxypropyl) amine, and pentaerythritol containing these reactants in amounts such that the molar ratio is about 1:0.4:0.2.

EXAMPLE 10

(a) A tricarboxylic acid is prepared by first dehydrating citric acid to produce 2-pentene-1,3,5-tricarboxylic acid. Then brominated poly(1-hexene) having an average molecular weight of about 2000 and a bromine content of 4% is heated with the tricarboxylic acid for twenty hours at a temperature of about 145°–155° C., the molar ratio of brominated polymer to acid being 1:1. The resulting reaction mass is then diluted with 30% mineral oil, and filtered, the filtrate being an oil solution of the desired polyhexenyl-substituted tricarboxylic acid.

(b) A mixture comprising the filtrate of (a), TMP, and pentaerythritol in amounts sufficient to provide a molar ratio of reactants of 1:1:0.5 is reacted following the general procedure of Example 1 but using a catalytic amount of p-toluene sulfonic acid esterification catalyst.

EXAMPLE 11

To a mixture comprising 55 parts of trismethylolaminomethane [i.e., $H_2N-C-(CH_2OH)_3$] and 62 parts of pentaerythritol heated to 200° C. there is added over a 1.5-hour period 1039 parts of a polyisobutenyl-substituted succinic anhydride (prepared according to the general procedure set forth in Example 1) while maintaining a reaction temperature of about 200–210° C. and blowing with nitrogen to assist in water removal. The reaction mixture is then heated at 200–215° C. for about five hours with further nitrogen blowing. Then 931 parts of low viscosity mineral oil is added over one hour and the resulting mass is cooled to 150–160° C. and filtered. The filtrate is an oil-solution of the desired oil-soluble composition comprising about 45% mineral oil.

EXAMPLE 12

Fifty-two parts of glycerol and 78 parts of pentaerythritol are mixed at room temperature and heated to about 162° C. until the pentaerythritol dissolves. Then 200 parts of polyisobutenyl-substituted succinic anhydride of Example 11 is added to the alcohol mixture over a 0.5-hour period at a temperature of about 160° C. with nitrogen blowing. The mixture is then heated to about 200–210° C. and an additional 366 parts of the anhydride is added over a 4.5-hour period while nitrogen blowing is maintained. Low viscosity mineral oil (1020 parts) is added and the resulting mass is heated at 210–240° C. with nitrogen blowing for seven hours and is subsequently filtered at 150–160° C. The filtrate is a 45% oil solution of the desired oil-soluble composition of this invention.

By following the procedures discussed herein above and exemplified in the foregoing examples, other oil-soluble compositions of this invention can be prepared by replacing all or a portion of the acylating agents or polyhydric alcohols with other acylating agents or polyhydric alcohols as described herein.

As mentioned before, the complex esters produced as oil-soluble compositions of this invention are useful as additives in lubricants and fuels. When employed as lubricating oil additives they may be present in amounts of from about 0.01% to about 30% by weight in the final lubricating composition. Ordinarily, when used as additives for lubricating oil compositions, they will be present in amounts of from about 0.5% to about 10% by weight although under unusually adverse conditions, such as in the operation of certain diesels, they may comprise up to about 30% by weight of the lubricant. The oil-soluble compositions are partcularly useful as dispersants in lubricating oil compositions used in the crankcase of various internal combustion engines.

The additives of this invention can be effectively employed in a variety of lubricating compositions based on diverse oils of lubricating viscosity such as a natural or synthetic lubricating oil, a mixture of miscible or mutually soluble natural oils or synthetic oils, or a mixture of miscible or mutually soluble natural and synthetic oils. The term "miscible" is intended to described that situation where two or more oils are sufficiently soluble to be compatible as a base oil, whereas the terminology "mutually soluble" is intended to describe the situation where a suitable common solvent, perhaps another lubricating oil, permits the use of two or more lubricating oils in combination where they would not otherwise be compatible due to solubility problems. Typical examples of natural and synthetic oils are identified hereafter. These examples are illustrative and not intended to be exhaustive.

The lubricating compositions contemplated include principally crankcase lubricating oils for spark-ignited and compression-ignited internal combustion engines including automobile and truck engines, aviation piston engines, marine and railroad diesel engines, and the like. However, automatic transmission fluids, transaxle lubricants, gear lubricants, metal-working lubricants, hydraulic fluids, and other lubricating compositions can benefit from the incorporation of the present additives. It is also anticipated that the lubricating compositions will be thickened or converted to greases by conventional techniques well-known in the art to form lubricating greases.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylene, propylene-isobutylene copolymers, chlorinated polybutylenes, etc.); alkyl benzenes (e.g., dodecylbenzenes, tetradecylbenzene, dinonylbenzenes, di-(2-ethylhexyl)benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers, (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra-(2-ethylhexyl)-silicate, tetra-(4 - methyl-2-tetraethyl)-silicate, tetra-(p-tert-butylphenyl)-silicate, hexyl-(4-methyl - 2 - pentoxy)disiloxane, poly(methyl)-siloxanes, poly(methylphenyl) - siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetra-hydrofurans, and the like.

The oil-soluble compositions of this invention may be used alone in lubricants although they are normally used in conjunction with other conventional lubricating oil additives of the type illustrated in the above-identified U.S. patents. The conventional additives include extreme pressure agents, metal containing detergents such as normal and basic oil-soluble alkaline earth metal phenates and petrosulfonates, viscosity index improving agents, oxidation inhibitors, antifoam agents, ashless dispersants, corrosion inhibitors, and the like. Typical examples of these conventional additives are set forth in the above incorporated patents.

In fuels, the oil-soluble compositions of the invention promote engine cleanliness by reducing or eliminating harmful deposits in the fuel system, engine, and exhaust system through their dispersant capabilities. They are primarily intended for use in the normally liquid petroleum distillate fuels, that is, the petroleum distillates which boil in the range characteristic of petroleum fuels such as gasolines, fuel oil, diesel fuels, aviation fuels, kerosene, and the like. When employed in fuels, they are generally employed in lower concentrations than in lubricants, for example, in amounts of from about 0.0001% to about 2% by weight and generally in amounts of from about 0.001% to about 0.5% by weight. As in the case of lubricants, other conventional fuel additives can be present in the fuel compositions contemplated herein. These conventional additives include lead scavengers, deicers, anti-screen clogging agents, other ashless dispersants, demulsifiers, and the like. Illustrative fuel additives of the type which can be used in combination with those of the invention are disclosed in U.S. Pats. 3,223,495; 3,307,928; and ashless dispersants of the type disclosed in the above incorporated patents.

The complex esters contain the oil-soluble compositions of this invention are generally characterized by improved dispersancy characteristics when compared to those prepared from the same acid and only one of the alcohols included in (A) or (B). This improved dispersancy capability is demonstrated by the following dispersancy ratings for oil-soluble compositions of the type contemplated by the present invention and similar compositions prepared from polyhydric alcohols falling within (A) or (B).

The following ratings are the results derived from evaluating the indicated materials in a dispersancy rating test. A rating of 100 means the material is equal to the standard used for comparison, that is, a commercial ashless dispersant. Ratings in excess of 100 demonstrate dispersancy capabilities better than the commercial standard.

| Product of example: | Rating |
|---|---|
| 1 | 133 |
| 2 | 128 |
| 3 | 128 |

| Product of example: | Rating |
|---|---|
| 4 | 120 |
| 6 | 110 |
| (a) * | 91 |
| (b) * | 106 |

*(a) and (b) are oil-soluble compositions prepared according to the general procedure of Example 1 by reacting polyisobutenyl-substituted succinic anhydride with TMP and TME in a mole ratio of 1:2 and 1:1, respectively. By comparing the results of Example 1 with that of Example 6, the reason for the preference of a simultaneous reaction of (A), (B), and (C) is apparent.

The following compositions are illustrative of lubricants and fuels of the type contemplated by the present invention.

COMPOSITION A

SAE 10W–30 mineral lubricating oil containing 1.5% of the filtrate of Example 1 and 0.06% of phosphorus as the zinc salt of a phosphorodithioic acid prepared by the reaction of phosphorus pentasulfide with a mixture of 60% (mole) of p-butylphenol and 40% (mole) of n-pentyl alcohol.

COMPOSITION B

SAE 20W–30 mineral lubricating oil containing 3.5% of the filtrate of Example 3, 0.075% of phosphorus as the zinc salt of a mixture of equal molar amounts of di-isopropylphosphorodithioic acid and di - n - nonylphosphorodithioic acid, and 2.5% of sulfate ash as a basic barium detergent prepared by carbonating at 150° C. a mixture comprising mineral oil, 1 mole of barium didodecylbenzene sulfonate and 3 moles of barium hydroxide in the presence of a small amount of water and 0.7 mole of octylphenol as the promoter.

COMPOSITION C

Synthetic ester lubricating oil (diisoctylazelate) containing 0.6% of the filtrate of Example 7.

COMPOSITION D

SAE 80 mineral lubricating oil containing 2% of the filtrate of Example 4, 0.1% of phosphorus as zinc di-n-hexylphosphorodithioate, 10% of chlorinated paraffin wax having a chlorine content of 40%, 2% di-butyltetrasulfide, 2% of sulfurized dipentene, 0.2% of oleylamide, 0.003% of an antifoam agent, 0.02% of a pour point depressant, and 3% of polyisobutylene (average molecular weight 80,000–100,000) as a viscosity index improver.

COMPOSITION E

SAE 10W–30 mineral lubricating oil containing 6% of the filtrate of Example 5, 0.075% of phosphorus as the zinc salt of di-n-octylphosphorodithioate, and 5% of a barium salt of an acid prepared by the reaction of 1000 parts of a polyisobutene having an average molecular weight of 60,000 with 100 parts of phosphorus pentasulfide at 200° C. and hydrolyzing the product with steam at 150° C.

COMPOSITION F

Gasoline containing 0.005% of the filtrate of Example 2.

COMPOSITION G

Diesel fuel containing 0.01% by weight of the filtrate of Example 7.

COMPOSITION H

Kerosene containing 0.025% of the product of Example 9.

Additional lubricants and fuels are readily prepared by adding the oil-soluble compositions of this invention to other base oils, natural or synthetic, and other fuels in the presence or absence of additional conventional additives as discussed above.

What is claimed is:

1. An oil-soluble composition produced by the process comprising simultaneously reacting under esterification conditions (A) at least one substituted aliphatic polycarboxylic acid acylating agent selected from the class consisting of the carboxylic acids per se and their corresponding halides, anhydrides, and esters having an average of at least about 50 aliphatic carbon atoms in the substituents with (B) at least one aliphatic polyhydric alcohol having two to three hydroxyl groups and (C) at least one aliphatic polyhydric alcohol containing at least four hydroxyl groups where the molar ratio of $(A):(B):(C)$ is about $1:X:Y$ where $5 \geq X+Y \geq 0.5$, X being about equal to or greater than Y.

2. An oil-soluble composition according to claim 1 wherein (A) is at least one substantially saturated aliphatic hydrocarbon-substituted succinic acid acylating agent wherein the substituent has an average molecular weight of about 700–5000, (B) is at least one di- or trihydric lower alkanol, (C) is at least one tetra-, penta-, or hexahydric lower alkanol, and the value of $X+Y$ does not exceed 3.

3. An oil-soluble composition according to claim 2 wherein (A) is at least one member selected from the group consisting of polymerized (lower1-monoolefin)-substituted succinic acids or the corresponding acid anhydrides, (B) is at least one trihydric lower alkanol, and the value of $X+Y$ is between about 0.75 and 2.0 where $X \geq Y$.

4. An oil-soluble composition according to claim 3 wherein (A) is at least one polybutylene-substituted succinic acid or anhydride, (B) is trimethylolpropane, trimethylolethane, or mixtures thereof, and (C) is pentaerythritol.

5. A lubricant composition comprising a major amount of a lubricating oil and a minor amount of an oil-soluble composition according to claim 1.

6. A lubricant comprising a major amount of a lubricating oil and a minor amount of an oil-soluble composition according to claim 2.

7. A lubricant comprising a major amount of a mineral lubricating oil and a minor amount of an oil-soluble composition according to claim 3.

8. A lubricant composition comprising a major amount of a lubricating oil and a minor amount of an oil-soluble composition according to claim 4.

9. A fuel comprising a major amount of a normally liquid fuel and a minor amount of an oil-soluble composition according to claim 1.

10. A fuel composition comprising a major amount of a normally liquid fuel and a minor amount of an oil-soluble composition according to claim 3.

11. An oil-soluble composition according to claim 1 wherein said at least one substituted aliphatic polycarboxylic acid acylating agent has been prepared by reacting (1) an ethylenically unsaturated carboxylic acid, acid halide, or anhydride with (2) an ethylenically unsaturated hydrocarbon containing at least about 50 aliphatic carbon atoms or a chlorinated hydrocarbon containing at least about 50 aliphatic carbon atoms at a temperature within the range of about 100°–300° C., with the provision that said ethylenically unsaturated hydrocarbon and said chlorinated hydrocarbon may contain polar substituents so long as said polar substituents do not exceed 10% by weight of the total weight of the ethylenically unsaturated hydrocarbon or chlorinated hydrocarbon.

12. An oil-soluble composition according to claim 11 wherein the ethylenically unsaturated acidic reactant is an ethylenically unsaturated polycarboxylic acid or anhydride having at least one ethylenic linkage in an α,β-position with respect to at least one carboxyl function and contains up to ten carbon atoms.

13. A lubricant composition containing a major amount of a lubricating oil and from about 0.01% to about 30% by weight of an oil-soluble composition according to claim 11.

14. An oil-soluble composition comprising a major amount of a lubricating oil and from about 0.5% to about 10% by weight of an oil-soluble composition according to claim 12.

15. A fuel composition comprising a major amount of a normally liquid fuel and a minor amount of an oil-soluble composition according to claim 11.

16. A fuel composition comprising a major amount of a normally liquid petroleum distillate fuel and a minor amount of an oil-soluble composition according to claim 12.

References Cited

UNITED STATES PATENTS

| | | | |
|---|---|---|---|
| 3,326,965 | 6/1967 | Schultheis et al. | 260—485 G |
| 3,331,776 | 7/1967 | Krukziener | 252—56 D |
| 3,381,022 | 4/1968 | Le Suer | 252—56 D |

FOREIGN PATENTS

| | | |
|---|---|---|
| 1,031,140 | 5/1966 | Great Britain. |

DANIEL E. WYMAN, Primary Examiner

W. H. CANNON, Assistant Examiner

U.S. Cl. X.R.

44—70; 260—485 G